(12) United States Patent
Baker et al.

(10) Patent No.: US 8,345,715 B2
(45) Date of Patent: Jan. 1, 2013

(54) TIME VARYING SIGNAL QUALITY REPORTING

(75) Inventors: Matthew P. J. Baker, Canterbury (GB); Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 812 days.

(21) Appl. No.: 12/293,287

(22) PCT Filed: Mar. 19, 2007

(86) PCT No.: PCT/IB2007/050937
§ 371 (c)(1), (2), (4) Date: Sep. 17, 2008

(87) PCT Pub. No.: WO2007/107943
PCT Pub. Date: Sep. 27, 2007

(65) Prior Publication Data
US 2009/0104901 A1   Apr. 23, 2009

(30) Foreign Application Priority Data

Mar. 20, 2006 (EP) .................................... 06111401
Jan. 11, 2007 (EP) .................................... 07300722

(51) Int. Cl.
*H04J 3/06* (2006.01)
*H04L 12/28* (2006.01)
*G08C 25/02* (2006.01)
*H04W 4/00* (2009.01)

(52) U.S. Cl. .................. 370/519; 370/395.21; 370/329; 714/748

(58) Field of Classification Search .................. 370/329, 370/254, 255, 330, 331, 516–520; 455/522, 455/67.11, 67.13, 63.1, 132–135, 115.3, 455/277.2; 714/48, 52, 746, 748, 749, 751
See application file for complete search history.

(56) References Cited

U.S. PATENT DOCUMENTS

| | | | |
|---|---|---|---|
| 6,961,309 B2 * | 11/2005 | Carlson et al. | 370/235 |
| 7,047,473 B2 * | 5/2006 | Hwang et al. | 714/751 |
| 7,181,170 B2 * | 2/2007 | Love et al. | 455/67.13 |
| 7,526,523 B2 * | 4/2009 | Nekovee et al. | 709/204 |
| 2004/0067757 A1 | 4/2004 | Fukui | |
| 2004/0142698 A1 | 7/2004 | Pietraski | |
| 2004/0185788 A1 | 9/2004 | Terry et al. | |
| 2005/0100038 A1 | 5/2005 | Pietraski et al. | |
| 2005/0226182 A1 * | 10/2005 | Itoh | 370/329 |
| 2006/0068825 A1 * | 3/2006 | Iochi | 455/522 |

FOREIGN PATENT DOCUMENTS

| | | |
|---|---|---|
| EP | 1388964 A1 | 2/2004 |
| EP | 1309121 B1 | 9/2004 |
| EP | 1458118 A1 | 9/2004 |
| EP | 1569492 A2 | 8/2005 |
| WO | 0201743 A1 | 1/2002 |
| WO | 2005074312 A1 | 8/2005 |

* cited by examiner

*Primary Examiner* — Hanh Nguyen
(74) *Attorney, Agent, or Firm* — Larry Liberchuk

(57) ABSTRACT

A radio station (100) receives a data packet (D1, D2) and transmits an acknowledgement (ACK, N). It also transmits an indication of received signal quality (CQI). The time at which the indication of received signal quality (CQI) is transmitted is dependent on the type of acknowledgement transmitted, such as a positive acknowledgement (ACK) or negative acknowledgement (N).

13 Claims, 2 Drawing Sheets

United States Patent US 8,345,715 B2

TIME VARYING SIGNAL QUALITY REPORTING

FIELD OF THE INVENTION

The invention relates to a method of operating a radio station, a method of operating a communication system, a radio station, and a communication system.

BACKGROUND OF THE INVENTION

In mobile communication systems such as UMTS (Universal Mobile Telecommunication System) and cdma2000, channel quality indicator (CQI) reports are transmitted from a mobile station (MS) to a base station (BS) in order to assist the BS in selecting an appropriate transmission format (e.g. modulation and coding scheme) for downlink data transmissions, and/or to assist the BS in scheduling data transmissions to different MSs.

The following mechanisms for transmitting CQI reports are known:

a) configuring the MS to send a regular periodic CQI report (e.g. between every 2 ms and every 160 ms in the High Speed Downlink Packet Access (HSDPA) feature of UMTS), by sending a signalling message to the MS at the start of the periodic reporting, and another signalling message when the period of the reporting is to be changed or the reporting terminated;

b) configuring the MS to send a single CQI report after each received data packet;

c) configuring the MS to send a single CQI report after each negatively-acknowledged data packet;

d) using a signalling message to request a single one-off CQI report from the MS.

SUMMARY OF THE INVENTION

An object of the invention is to provide improved signal quality reporting.

According to a first aspect of the invention there is provided a method of operating a radio station, comprising: receiving a data packet; decoding the received data packet; selecting one of a plurality of response signals, dependent on the outcome of decoding; transmitting the selected response signal and an indication of received signal quality; and controlling the time of transmission of the indication of received signal quality to be dependent on which of the plurality of response signals is transmitted.

The invention is based on the realisation that, in a time-varying channel, efficient downlink scheduling and efficient use of adaptive modulation and coding requires up-to-date channel quality information, that the interval between transmitting data packets in some communication systems can vary, dependent on the outcome of decoding, and that efficiency can be improved by adapting the time of transmission of the CQI reports dependent on the outcome of decoding.

According to a second aspect of the invention there is provided a method of operating a communication system comprising a first radio station and a second radio station, comprising operating the first radio station in accordance with the method of the first aspect of the invention, and at the second radio station: transmitting a data packet to the first radio station; receiving the response signal and the indication of received signal quality and employing the indication of received signal quality to select a transmission format for, dependent on the response signal, transmitting another data packet or retransmitting a previously transmitted data packet.

According to a third aspect of the invention there is provided radio station comprising: receiver means for receiving a data packet; decoder means for decoding the received data packet; selector means for selecting one of a plurality of response signals, dependent on the outcome of decoding; transmitter means for transmitting the selected response signal and for transmitting an indication of received signal quality; and control means adapted to control the time of transmission of the indication of received signal quality to be dependent on which of the plurality of response signals is transmitted.

According to a fourth aspect of the invention there is provided communication system comprising a first radio station in accordance with the third aspect of the invention, and a second radio station, the second radio station comprising: transmitter means for transmitting a data packet to the first radio station; receiver means for receiving the response signal and the indication of received signal quality; and selector means adapted to employ the indication of received signal quality to select a transmission format for, dependent on the response signal, transmitting another data packet or retransmitting a previously transmitted data packet.

Optionally the plurality of response signals comprises a positive acknowledgement which is transmitted when the data packet has been decoded successfully and a negative acknowledgement which is transmitted when the data packet has been decoded unsuccessfully, and a later time is selected for transmission of the indication of received signal quality when a positive acknowledgement is transmitted than when a negative acknowledgement is transmitted. This can be advantageous in a communication system where a retransmission may, or is likely to, take place earlier than the transmission of a new data packet; the later transmission time of the indication of received signal quality enables the indication to more reliably represent the signal quality corresponding to the time when the new data packet is transmitted.

Optionally the negative acknowledgement comprises the indication of received signal quality, that is the negative acknowledgement and the indication of received signal quality are combined into the same transmitted signal. This can be advantageous in requiring less signalling overhead than transmitting two separate signals.

Optionally the later time of transmission of the indication of received signal quality when a positive acknowledgement is transmitted is dependent on the average time interval between a plurality of received data packets. This can be advantageous by enabling the later time of transmission to adapt to the prevailing traffic conditions.

Optionally the radio station may refrain from transmitting the indication of received signal quality when the received signal quality complies with a predetermined criterion. This can be advantageous by reducing the amount of signalling transmitted when the signal quality information is less useful. The predetermined criterion may be, as a first example, when the received signal quality is below a predetermined quality threshold, or as a second example, when the received signal quality has changed by no more than a predetermined amount in a predetermined time period.

BRIEF DESCRIPTION OF THE DRAWINGS

The invention will now be described, by way of example, with reference to the accompanying drawings wherein.

DESCRIPTION OF PREFERRED EMBODIMENTS

Figure 1:
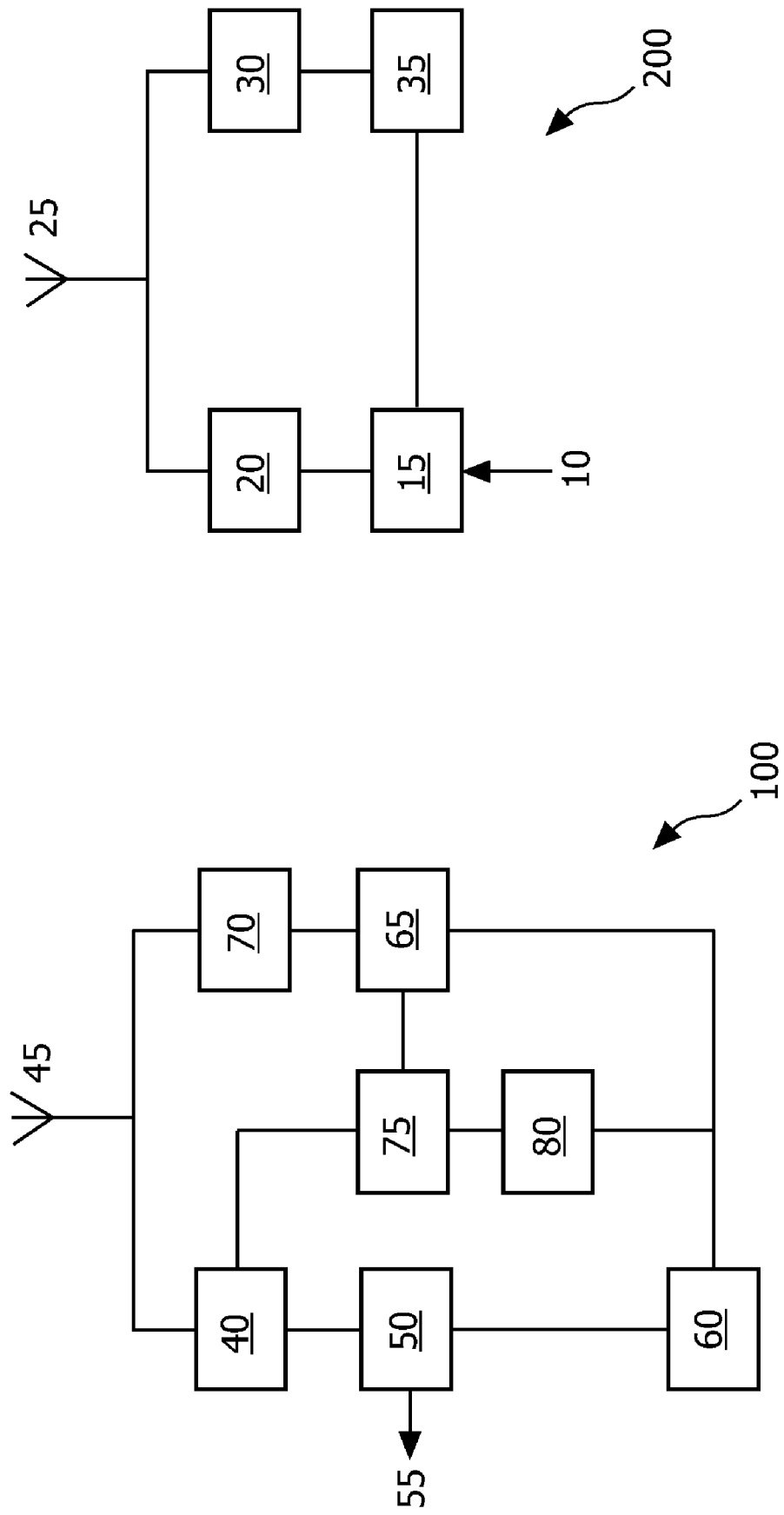
FIG. 1 is a block schematic diagram of a communication system.

Referring to FIG. 1, there is illustrated a block schematic diagram of a communication system comprising a first radio station 100 and a second radio station 200.

The first radio station 100 comprises a receiver 40 for receiving data packets transmitted by the second radio station 200. The receiver 40 has an input coupled to an antenna 45 and an output coupled to a decoder 50 for decoding the received data packets. Decoded data is delivered on an output 55 of the decoder. Coupled to an output of the decoder 50 is a selector 60 that is adapted to select one of a plurality of responses, dependent on the outcome of decoding. For example, if the decoding is successful the selector 60 may select a positive acknowledgement, whereas if the decoding is unsuccessful, for example due to errors, the selector 60 may select a negative acknowledgement. An output of the selector 60 is coupled to an input of an encoder 65 which encodes the response and delivers the encoded response to a transmitter 70 for transmission via the antenna 45 to the second radio station 200. A signal quality measurement device 75 is coupled to an output of the receiver 40 for measuring the quality of received signals and for generating an indication of received signal quality, such as a CQI report. The indication of received signal quality is delivered to the encoder 65 where it is encoded for transmission via the transmitter 70 to the second radio station 200. The signal quality measurement device 75 is coupled to a controller 80 and the controller is coupled to the selector 60. The controller 80 is adapted to control the time of transmission of the indication of received signal quality dependent on which response is selected by the selector 60. The timing of transmissions is described in detail below.

Optionally, the encoder 65 may be adapted to combine a negative acknowledgement and an indication of received channel quality into the same transmitted signal.

Optionally, the controller 80 is adapted to measure the average time interval between a plurality of received data packets and to select the time of transmission of an indication of received signal quality dependent on the measured average value.

The second radio station 200 comprises an input 10 for receiving data for transmission, and an encoder 15 for encoding the data for transmission. An output of the encoder 15 is coupled to an input of a transmitter 20, and an output of the transmitter is coupled to an antenna 25. There is a receiver 30 coupled to the antenna 25 for receiving response signals and indications of received signal quality from the first radio station 100. There is a selector 35 coupled to the receiver 30 and to the encoder 15, which is adapted to determine, dependent on the received response signal, whether a previously transmitted data packet should be retransmitted or a new data packet should be transmitted. The selector 35 is further adapted to employ the received indication of received signal quality to select a transmission format, for example modulation and/or coding, for the transmission of a data packet.

Figure 2:
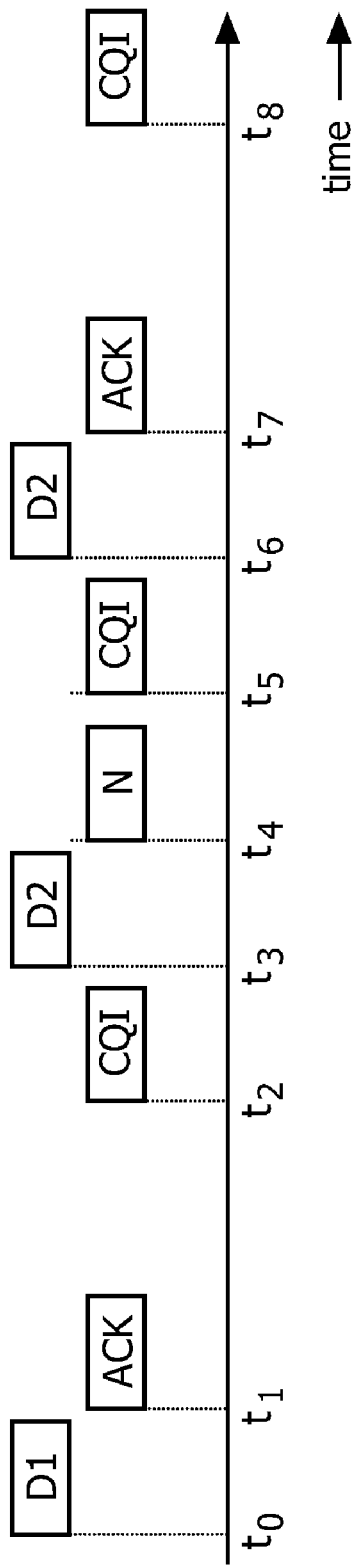
FIG. 2 is a timing diagram illustrating the transmission of data packets, acknowledgements and CQI reports.

Referring to FIG. 2, there are illustrated data packets (denoted D1 and D2) transmitted by the second radio station 200, and responses (denoted ACK and N) and indications of received signal quality (denoted CQI and referred to below as CQI reports) transmitted by the first radio station 100.

CQI may additionally or alternatively comprise an indication of one or more characteristics of a radio channel, such as channel state, channel transfer function, angle of arrival, channel impulse response or path loss.

Data packet D1 is transmitted at time to. The data packet D1 is decoded successfully and in response a positive acknowledgement ACK is transmitted at time $t_1$. Subsequently, at time $t_2$ a CQI report is transmitted. The ACK and the CQI are received by the second radio station 200 which transmits a new data packet D2 at time $t_3$ using a transmission format selected dependent on the CQI report. The data packet D2 is received unsuccessfully and in response a negative acknowledgement N is transmitted at time $t_4$. Subsequently at time $t_5$ a CQI report is transmitted. At time $t_6$ the second radio station 200 retransmits the data packet D2. The second transmission of the data packet D2 is decoded successfully and so a positive acknowledgement ACK is transmitted at time $t_7$, and a CQI report is transmitted at time $t_8$, in a manner corresponding to the ACK and CQI report at times $t_1$ and $t_2$ respectively.

Although FIG. 2 is not intended to be drawn to scale, note that the delay between the first transmission of D2 and the retransmission of D2 ($t_6$-$t_3$) is shorter than the delay between the first transmission of D1 and the first transmission of D2 ($t_3$-$t_0$). In this typical communication system, in general retransmissions of a data packet are available for transmission sooner than new data packets. Therefore, the CQI report transmitted at time $t_5$ is transmitted relatively soon after the negative acknowledgement N ($t_5$-$t_4$), whereas the CQI report transmitted at time $t_2$ is transmitted relatively late after the positive acknowledgement ACK ($t_2$-$t_1$). By varying the time of transmission of CQI reports in this way, it is possible to ensure that the time delay between the receipt of a CQI report at the second radio station 200 and the next transmission of a data packet is short, thereby enabling the CQI report to closely represent the channel conditions when the data packet is transmitted.

Optionally, the delay $t_2$-$t_1$ may be selected dynamically, based on a measurement of the average time interval between a plurality of received data packets (such as $t_3$-$t_0$). The measurement of this average time interval may be may at the first radio station 100, or measured at the second radio station 200 and transmitted to the first radio station 100.

Optionally, the transmission of new data packets from the second radio station 200 may be periodic; that is, the time interval between transmissions of new data packets is constant. Transmissions arranged in this way may for example be used to carry a "Voice over Internet Protocol" (VoIP) service. In such an example, the average time interval between received data packets will be equal to the time interval between each received data packet.

Optionally, the delay $t_2$-$t_1$ may be equal to the average time interval described above less a shorter time interval, where the shorter time interval may be related to the number of retransmissions conducted for the previous data packet.

Figure 3:
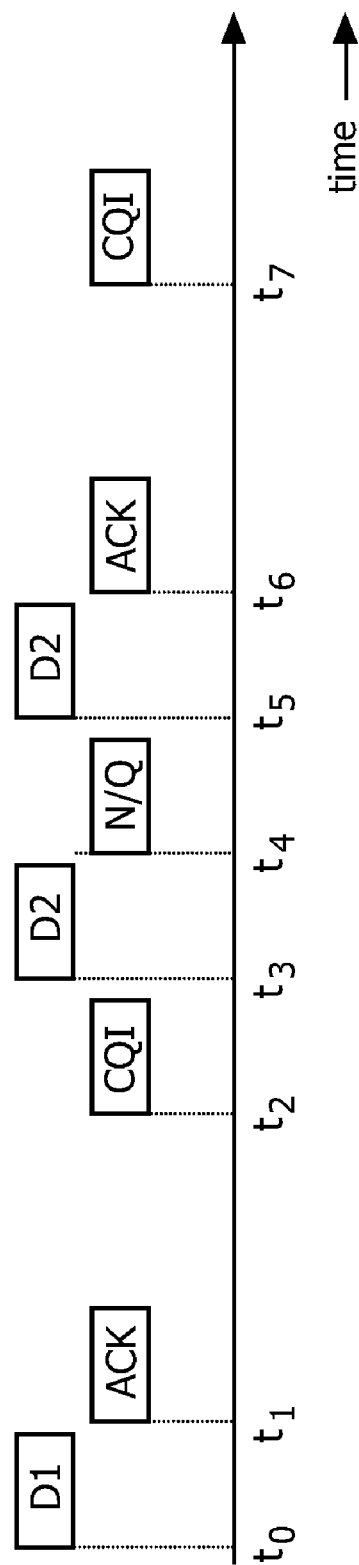
FIG. 3 is another timing diagram illustrating the transmission of data packets, acknowledgements and CQI reports.

Optionally, a negative acknowledgement N and a CQI report may be combined and transmitted in the same signal. This option is illustrated in FIG. 3, the combined negative acknowledgement and CQI report being denoted N/Q. This reduces the amount of signalling transmitted by the first radio station 100, and can enable delays to be reduced by permitting the retransmission of D2 in FIG. 3 (at time $t_5$) to occur earlier than the retransmission of D2 in FIG. 2 (at time $t_6$).

Optionally, the first radio station 100 may refrain from transmitting the indication of received signal quality when the received signal quality complies with a predetermined criterion. This can result in reduced signalling and increased system efficiency. As a first example, the predetermined criterion may be the received signal quality falling below a predetermined quality threshold; in this case the second radio station 200 may defer transmitting a data packet until channel conditions have changed, and may choose a different destination to transmit data to. As a second example, the predetermined criterion may be the received signal quality changing by no more than a predetermined amount in a specific time period; in this case the second radio station 200 may continue to employ the previously used transmission format. The specific time period may be, for example, a time period signalled to the first radio station 100 by the second radio station 200, or may be the time elapsed since the previous transmission of a CQI report.

The embodiment described above uses two different response signals, a positive and a negative acknowledgement. However, the invention can also be used with more than two response signals, for example different acknowledgements may be used to indicate different portions of a data packet that may need to be retransmitted. Correspondingly, different delay periods may be used for transmitting the CQI report, according to the type of response signal.

The embodiment described above uses two different response signals, a positive and a negative acknowledgement, to indicate respectively successful or unsuccessful decoding. The definition of successful and unsuccessful is system dependent. For example, successful may denote a data packet that has no residual bit errors remaining after decoding, whereas unsuccessful may denote residual bit errors remaining after decoding. However, in some applications a few residual bit errors may be tolerable, so may be regarded as successful.

The invention is applicable for data packet transmission from a base station to a mobile station, or from a mobile station to a base station, or between peer nodes.

In the present specification and claims the word "a" or "an" preceding an element does not exclude the presence of a plurality of such elements. Further, the word "comprising" does not exclude the presence of other elements or steps than those listed. The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communications and which may be used instead of or in addition to features already described herein.

The invention claimed is:

1. A method, comprising:
   receiving a data packet (D1) by a first radio station;
   decoding the received data packet (D1);
   selecting one of a plurality of response signals (ACK, N), dependent on the outcome of decoding;
   transmitting the selected response signal (ACK, N) and an indication of received signal quality (CQI); and
   controlling, by the first radio station, a time period between transmission of the selected response signal and transmission of the indication of received signal quality (CQI) to be a particular length that is dependent on which response signal of the plurality of response signals (ACK, N) is transmitted as the selected response signal.

2. The method as claimed in claim 1, wherein the plurality of response signals comprises a positive acknowledgement (ACK) which is transmitted when the data packet (D) has been decoded successfully and a negative acknowledgement (N) which is transmitted when the data packet (D) has been decoded unsuccessfully, and wherein a first time period between transmission of the CQI and the ACK is longer than a second time period between transmission of the CQI and the N a negative acknowledgement (N).

3. The method as claimed in claim 2, wherein the negative acknowledgement comprises the indication of received signal quality (N/Q).

4. The method as claimed in claim 2, comprising selecting the later time of transmission dependent on the average time interval between a plurality of received data packets (D1, D2).

5. The method as claimed in claim 1, comprising refraining from transmitting the indication of received signal quality (CQI) when the received signal quality complies with a predetermined criterion.

6. The method as claimed in claim 5, wherein the predetermined criterion is one of:
   the received signal quality is below a predetermined quality threshold;
   the received signal quality has changed by no more than a predetermined amount within a predetermined time period.

7. The method in accordance with claim 1, further comprising:
   transmitting, by a second radio station, a data packet (D1) to the first radio station;
   receiving, by the second radio station, the response signal (ACK, N) and the indication of received signal quality (CQI) and employing the indication of received signal quality (CQI) to select a transmission format for, dependent on the response signal, transmitting another data packet or retransmitting a previously transmitted data packet.

8. A radio station comprising:
   a receiver for receiving a data packet (D1, D2);
   a decoder for decoding the received data packet;
   a selector for selecting one of a plurality of response signals (ACK, N), dependent on the outcome of decoding;
   a transmitter for transmitting the selected response signal (ACK, N) and for transmitting an indication of received signal quality (CQI); and
   a controller adapted to control a time period between transmission of the selected response signal and transmission of the indication of received signal quality (CQI) to be a particular length that is dependent on which response signal of the plurality of response signals (ACK, N) is transmitted as the selected response signal.

9. The radio station as claimed in claim 8, wherein the selector is adapted to select a positive acknowledgement (ACK) if the data packet has been decoded successfully and a negative acknowledgement (N) if the data packet has been decoded unsuccessfully, and wherein a first time period between transmission of the CQI and the ACK is longer than a second time period between transmission of the CQI and the N.

10. The radio station as claimed in claim 9, comprising an encoder adapted to encode the negative acknowledgement and the indication of received signal quality into the same transmitted signal (N/Q).

11. The radio station as claimed in claim 9, wherein the controller is adapted to select the later time of transmission dependent on the average time interval between a plurality of received data packets.

12. A communication system comprising a first radio station and a second radio station,
   the first radio station comprising:
      a receiver for receiving a data packet;
      a decoder for decoding the received data packet;
      a selector for selecting one of a plurality of response signals, dependent on the outcome of decoding;

a transmitter for transmitting the selected response signal and for transmitting an indication of received signal quality; and a controller adapted to control a time period between transmission of the selected response signal and transmission of the indication of received signal quality to be a particular length that is dependent on which response signal of the plurality of response signals is transmitted as the selected response signal, and the second radio station comprising:

a transmitter for transmitting the data packet to the first radio station;

a receiver for receiving the response signal and the indication of received signal quality; and a selector adapted to employ the indication of received signal quality to select a transmission format for, dependent on the response signal, transmitting another data packet or retransmitting a previously transmitted data packet.

13. The communication system as claimed in claim 12, wherein a first time period between transmission of the CQI and the ACK is longer than a second time period between transmission of the CQI and the N.

* * * * *